United States Patent [19]

DeSanti

[11] Patent Number: 4,687,289

[45] Date of Patent: Aug. 18, 1987

[54] FIBEROPTIC SPLICE ORGANIZER

[75] Inventor: Raymond J. DeSanti, Worcester, Mass.

[73] Assignee: BRIntec Corporation, Willimantic, Conn.

[21] Appl. No.: 776,799

[22] Filed: Sep. 17, 1985

[51] Int. Cl.⁴ ............................................... G02B 6/36
[52] U.S. Cl. ............................................... 350/96.20
[58] Field of Search ................ 350/96.20, 96.21, 96.22

[56] References Cited

U.S. PATENT DOCUMENTS

| 4,252,407 | 2/1981 | Bubanko et al. | 350/96.21 |
|---|---|---|---|
| 4,332,435 | 6/1982 | Post | 350/96.20 |
| 4,359,262 | 11/1982 | Dolan | 350/96.20 |
| 4,627,686 | 12/1986 | Szentesi | 350/96.2 |

FOREIGN PATENT DOCUMENTS

| 3248003 | 6/1984 | Fed. Rep. of Germany | 350/96.20 |
|---|---|---|---|
| 57-53715(A) | 3/1982 | Japan | 350/96.21 |

Primary Examiner—John Lee
Assistant Examiner—John Ngo
Attorney, Agent, or Firm—McCormick, Paulding & Huber

[57] ABSTRACT

A fiberoptic splice organizer having a main body channel containing a pair of strain relief cradles to which jacketed end portions of spliced fiberoptic cables are clamped and providing storage space for looped portions of the cables. At least one shallow fiber tray is clamped to the main body channel and provides a closure for a portion of the open end of the channel and storage space for looped fibers which comprise the cables. A splice holder secured within the one tray supports an array of parallel tubular splices and releasably retains the splices in position while the splice organizer is further assembled. A splice holder cover which overlies the splice holder to further retain the splices in the holder and a protective cover which provides a closure for the fiber tray complete the assembly. The splice holder cover be assembled with the splice holder in either of two positions to accommodate either hot splices or mechanical splices, which differ in size.

16 Claims, 6 Drawing Figures

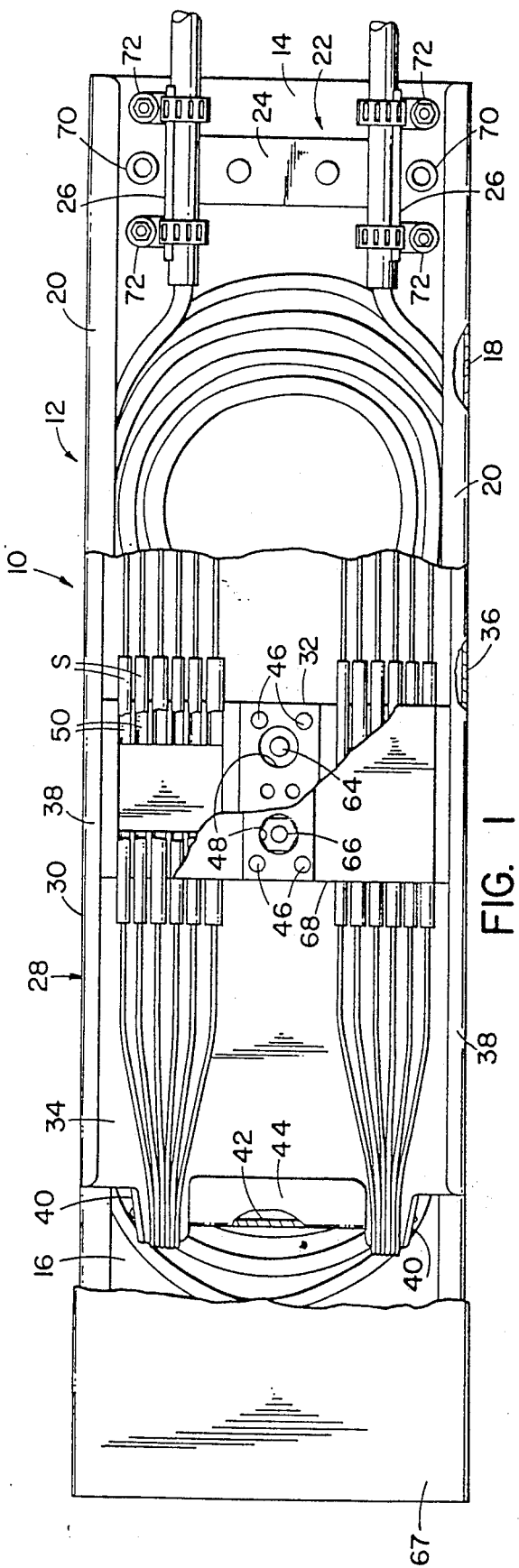
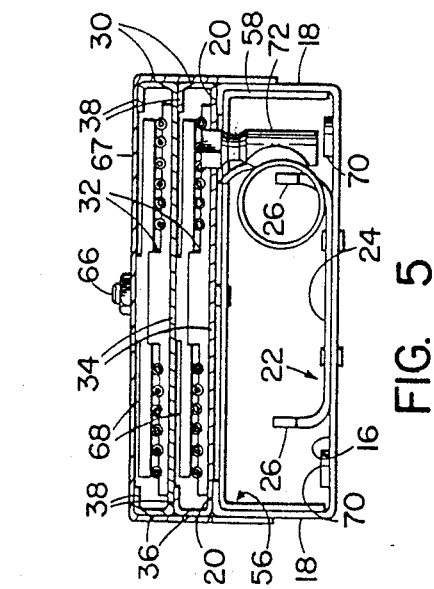
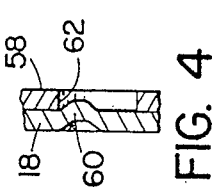
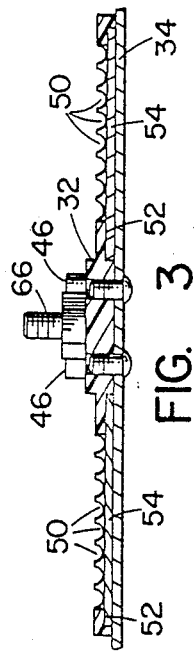
FIG. 1
FIG. 2
FIG. 3
FIG. 4
FIG. 5
FIG. 6

FIBEROPTIC SPLICE ORGANIZER

BACKGROUND OF THE INVENTION

This invention relates in general to fiberoptic equipment and deals more specifically with improvements in fiberoptic splice organizers of the type used in telecommunication applications to provide mechanical protection for one or more splices, each splice having been formed either by fusing or adhesively bonding two optical fibers together in end-to-end relation after the fibers have been accurately coaxially aligned. Further environmental protection for the spliced fibers is usually provided by encapsulating the entire splice organizer within a weather resistant closure or casing in a manner well-known in the telecommunications art.

It is the general aim of the present invention to provide an improved splice organizer of the aforedescribed general type particularly adapted for rapid field assembly and without necessity for special tools and which provides strain relief for the fiberoptic cables which contain the optical fibers which have been spliced. It is a further aim of the invention to provide an improved splice organizer for holding splices which may vary greatly in number and which may be readily adapted for receiving and holding splices which vary in size. Yet another aim of the present invention is to provide a splice organizer which has storage space to accommodate loops of fiber having at least 3 inch radial bends to enable splice repair without requiring cable replacement and which will fit within existing enclosures or casings to facilitate system upgrading.

SUMMARY OF THE INVENTION

In accordance with the present invention, a fiberoptic splice organizer has an elongated body which includes an upwardly open body channel. Strain relief means disposed within the channel secures fiberoptic cable in fixed position relative to the main body. At least one elongated upwardly open fiber tray assembly supported on the main body above the body channel and in longitudinal alignment with the channel provides a closure for an associated portion of the opening at the upper end of the channel and a storage area for loops of optical fiber for use when splice repair is required. A splice holder disposed within the fiber tray has a plurality of generally parallel longitudinally extending and upwardly open splice receiving grooves for holding fiberoptic splices therein. A splice holder cover supported on the splice holder above the grooves retains the fiberoptic splices in position within the holder. Clamping means associated with the main body releasably secures the one fiber tray assembly to the body and the splice holder cover to the splice holder.

BRIEF DESCRIPTION OF THE DRAWINGS

FIG. 1 is a plan view of a fiberoptic splice organizer embodying the present invention and shown with portions of the organizer cover, splice holder cover, and splice tray broken away to reveal structure there below.

FIG. 3 is a somewhat enlarged fragmentary sectional view through the splice holder and fiber tray taken along the line 3—3 of FIG. 2.

FIG. 4 is a somewhat enlarged fragmentary sectional view taken along the line 4—4 of FIG. 2.

FIG. 5 is an end elevational view of a typical fiberoptic splice holder embodying the present invention including two splice trays and shown partially in section.

FIG. 6 is an axial sectional view through a typical optical fiber splice.

DETAILED DESCRIPTION OF THE PREFERRED EMBODIMENT

Figure 2:
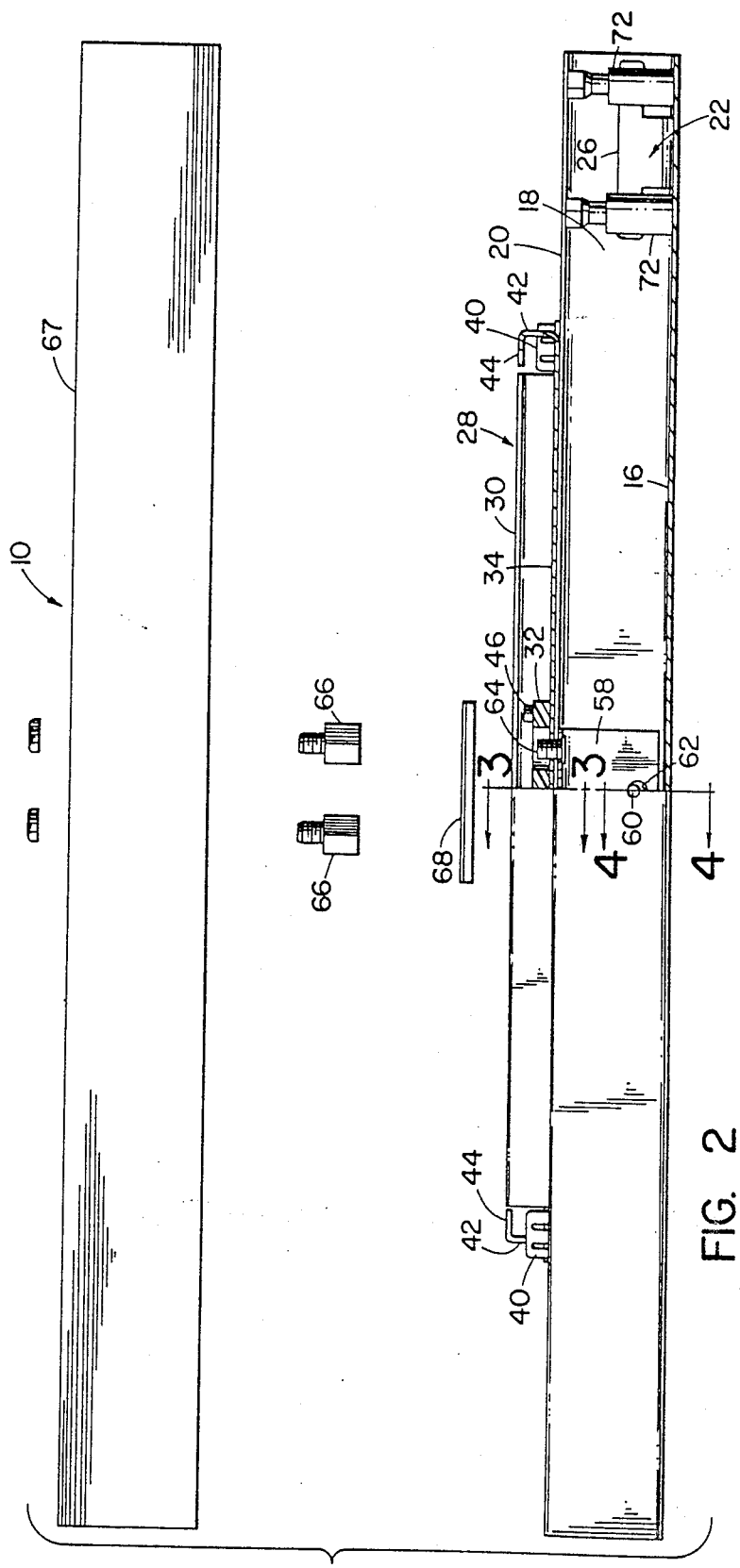
FIG. 2 is an exploded side elevational view of the splice holde of FIG. 2 shown partially in longitudinal section.

Turning now to the drawings and referring first particularly to FIGS. 1-4, a fiberoptic splice organizer embodying the present invention is indicated generally by the reference numeral 10. The illustrated splice organizer 10 is particularly adapted for telecommunications applications to provide mechanical protection for one or more fiberoptic splices formed by permanently joining coaxially aligned optical fibers or waveguides in end-to-end relation to each other and to provide protective storage for loops of optical fiber which comprise the splices. The splice organizer 10 further provides strain relief for fiberoptic cables from which the optic fibers which comprise each splice emanate.

A typical splice indicated generally by the letter S and best shown in FIG. 6, is formed by uniting two optical fibers designated by the letters F, F in end-to-end relation to each other after the fibers have been accurately coaxially aligned. The fibers may be joined by a hot splice formed by fusing the fibers together in face-to-face relation by the application of heat, such as from the heat from an electrical arc, or adhesively bonded together using an appropriate adhesive such as an epoxy compound or the like to form a mechanical splice. Preferably, and as shown, the joint is disposed within a tubular sleeve indicated by the letter T and made from a suitable dielectric material as, for example, a plastic material or glass or fiberglass. The illustrated sleeve S includes a rigid member or rod R supported in axially parallel relation to the splice and by an outer tubular member M which imparts rigidity to the splice. The rigid member is preferably made from magnetic material for a purpose which will be hereinafter evident.

Considering now the splice organizer in further detail, it has an elongated main body, indicated generally at 12, which is preferably formed from flat metal and defines an elongated channel 14. As oriented in the drawings, the main body has a generally rectangular bottom wall 16 and parallel side walls 18, 18 bent upwardly from the bottom wall. The upper marginal edges of the side walls are turned inwardly toward each other to form spaced apart lips 20, 20 at the upper end of the channel 14 which lie within a common plane parallel to the bottom wall 16.

At least one strain relief device indicated generally at 22 is disposed within the body channel 14. However, the illustrated splice organizer has two strain relief devices or cradles 22, 22 (one shown) mounted in fixed position on the bottom wall 16 near opposite ends of the channel. Each strain relief cradle has a substantially flat central portion 24 disposed adjacent the bottom wall and end portions which curve accurately, outwardly and upwardly from the central portion and terminate in longitudinally extending T-bars 26, 26 spaced above the bottom wall 16. The central portion of each strain relief cradle is riveted or otherwise fastened in fixed position to the bottom wall 16.

At least one fiber tray assembly, indicated generally at 28, is mounted on the body and includes a fiber tray 30 and a splice holder 32 releasably fastened in fixed position within a central part of the tray. The fiber tray 30 is relatively shallow and has a width substantially equal to the width of the body 12. However, the tray is of somewhat shorter length than the main body. It is preferably formed from flat metal and has a generally rectangular bottom wall 34 and elongated parallel side walls 36, 36 bent upwardly from the bottom wall. The upper end portions of the side walls 36, 36 are bent inwardly toward each other and form supporting lips 38, 38 which lie in a common plane parallel to the bottom wall 34 and extend along a substantial portion of the length of the tray 30. Slotted retaining tabs 40, 40 bend upwardly from the bottom wall 34 at opposite sides and opposite ends of the tray are spaced laterally inwardly some distance from the side walls 36, 36 and converge toward the ends of the tray. The tray further includes a pair of end walls 42, 42. Each end wall is located between an associated pair of retaining tabs 40, 40 and cooperates with the latter tabs and the bottom wall 34 to define a pair of laterally spaced apart openings at each end of the tray. The upper end of each end wall 42 is bent inwardly or in the direction of the opposite end wall and forms a tab 44 spaced upwardly from the bottom of the tray and disposed within the plane of the lips 38, 38.

The splice holder 32 is formed from a rectangular block of dielectric material, mounted in a central portion of the tray, and extends generally across the tray between the side walls 36, 36. An upwardly facing central portion of the splice holder carries a plurality of upwardly projecting locating posts 46, 46 and has a pair of circular bores 48, 48 extending through it. A transversely spaced series of longitudinally extending splice receiving grooves 50, 50 is formed in the upper surface of the splice holder 32 to either side of the central portion. The latter grooves are preferably shaped to compliment associated portions of generally cylindrical sleeves which such as the sleeves M, M which comprise the various splices S, S such as shown in FIG. 6.

The splice holder has a pair of recesses 52, 52 which open through its lower surface as best shown in FIG. 3. Each recess 52 is located immediately below an associated group of splice holder grooves 50, 50 and receives a magnet 54 therein. The magnet comprises a generally rectangular block of magnetic material and is held in fixed position by assembly of the splice holder 32 with the fiber tray 30. More specifically, fasteners extend upwardly through the bottom of the splice tray and threadably engage the splice holder to releasably secure the holder 32 and the magnets 54, 54 associated therewith in assembly with the fiber tray 30.

The fiber tray assembly 28 is releasably secured in assembly with the main body 12 by a clamping assembly indicated generally at 56 which includes an inverted generally U-shaped clamping member 58 which slideably received within the channel 14. In assembly, the side portions of the U-shaped clamping member 58 are disposed immediately adjacent the inner surfaces of the side walls 18, 18. An inwardly projecting indentation 60 on the inner surface of each side wall is adapted to be received in an aperture 62 in an associated vertical leg of the clamping member 58, such as shown in FIG. 4, to releasably secure the clamping member in fixed position at a predetermined central location within the channel. A pair of threaded studs 64, 64 project upwardly from the central portion of the clamping member 58 and extend through fastener receiving openings in the fiber tray 30 and coaxially through the somewhat larger cylindrical bores 48, 48 in the central portion of the splice holder 32. A pair of stud nuts 66, 66 threaded onto the upper ends of the studs 64, 64 releasably secure the fiber tray assembly 28 in assembled relation with the main body 12.

A splice holder cover 68 formed from a generally rectangular block of dielectric material is provided to overlay the splice holder 32 for holding various splices S, S within the grooves 50, 50. Since mechanical splices are of somewhat larger diameter than hot splices, the central portion of the cover 68 is vertically offset from the outer end portions thereof so that the cover 68 may be assembled in either of two positions on the splice holder to accommodate either type of splice.

Threaded bosses 70, 70 attached to the bottom wall provide holders for extra stud nuts 66, 66 which may be required for securing additional fiber trays to the splice organizer to accommodate additional splices.

If desired, one or more additional trays may be stacked upon the lowermost tray engaged with the body. The number of trays which comprise the splice organizer assembly will, of course, be determined by the number of splices to be accommodated. The assembly is completed by positioning a cover 67 on the uppermost tray in the stack to provide a closure for the latter tray. The cover 67, essentially comprises an elongated inverted generally U-shaped channel member which is adapted to overlie the uppermost tray in stradling relation with the tray and the body. It is secured by nuts which engage the uppermost stud nuts 66, 66.

Preparatory to making a typical butt splice the splice holder assembly 10 is disassembled. An approximate 84 inch end portion of the outer jacket of each cable is removed, the primary tubes are trimmed to 44 inches and the fibers are bared to 41 inches. The stripped end portions are then cleaned to remove any gel from the primary tubes. The jacketed end portion of each cable is then clamped to an associated strain relief device 22 using a pair of hose clamps 72, 72, as best shown in FIG. 2. One full loop of one primary tube and one and one-half loops of the other primary tube are then positioned within the main body 12. Thereafter, a fiber tray assembly 30 is positioned on the main body with studs 64, 64 extending upwardly through it and stud nuts 66, 66 are then threaded onto the upper end of the studs 64, 64 to secure the tray in a central position relative to the main body 12.

The fibers are then arranged to enter the fiber tray through the end openings at the opposite ends of the end walls 42, 42 and are secured to the tray by wire ties threaded through the slots in associated retaining tabs 40, 40.

The splices are formed in a conventional manner well known in the fiberoptics are. Since the illustrated splice organizer 10 is provided with magnets 54, 54 it is particularly adapted for use with magnetic splices such as the splice illustrated in FIG. 6.

The splices S, S are positioned in the splice receiving grooves 50, 50. the first and second splices being preferably positioned within the laterally outboard grooves at opposite sides of the splice holder. Subsequent splices are preferably positioned inboard of the first and second splices. The magnets 54, 54 cooperate with the rods R, R to hold the splices in position within the splice holder until the assembly of the splice organizer has been completed.

When the splices have been positioned in the holder the splice holder cover 68 is placed on the holder 32. The locating posts 46, 46 are received in complementary apertures in the cover 68 and retain the cover in proper alignment with the splice holder. The illustrated splices are hot splices therefore the holder cover 68 is positioned on the holder with the outboard portions of the cover off-set vertically downward from the central portion of the holder to accommodate the hot splices which are somewhat smaller than splices of the mechanical type.

The illustrated fiber tray is adapted to accommodate 12 splices. Additional trays may be added to the assembly as required to accommodate further splices.

The assembly is completed by positioning the protective cover 67 on the uppermost fiber tray 30 and securing it with nuts threaded onto the upper ends of the uppermost stud nuts 66, 66.

I claim:

1. A fiberoptic splice organizer comprising an elongated main body formed from flat metal and having a generally rectangular bottom wall and a pair of opposing parallel side walls bent upwardly from said bottom wall, said side walls having upper marginal edges turned inwardly toward each other to form spaced apart lips at the upper end of said body lying within a common plane parallel to said bottom wall, said main body defining an upwardly open channel extending longitudinally therethrough, a pair of strain relief members mounted in fixed position on said bottom wall near opposite ends of said channel, a fiber tray assembly including a shallow fiber tray and a splice holder mounted in fixed position within said fiber tray, said fiber tray having a width substantially equal to the width of said main body and supported on said lips above said channel and forming a closure for an associated upper portion of said channel, said splice holder including a rectangular block of material having longitudinally extending and upwardly opening splice receiving grooves therein and means for releasably retaining fiberoptic splices within said grooves including a splice holder cover supported on said splice holder in substantially covering relation to said grooves, means defining a protective cover overlying said one fiber tray assembly and forming a closure for said fiber tray, and clamping means associated with said main body for releasably securing said fiber tray assembly to said body, said splice holder cover to said splice holder and protective cover in overlying relation to said fiber tray assembly.

2. A fiberoptic splice organizer as set forth in claim 1 wherein the fiberoptic splices have magnetic material associated therewith and said splice organizer includes magnetic means for releasably retaining the fiberoptic splices within said grooves when said splice holder cover is not in position on said splice holder.

3. A fiberoptic splice organizer as set forth in claim 2 wherein said magnetic means comprises a permanent magnet mounted between said splice holder and said bottom wall.

4. A fiberoptic splice organizer as set forth in claim 1 wherein said clamping means comprises an inverted generally U-shaped clamping member disposed within said channel below and in engagement with said lips and at least one fastener carried by said clamping member and extending through said one fiber tray, said splice holder and said splice holder cover and a stud nut threadably engaged with said fastener.

5. The fiberoptic splice organizer as set forth in claim 1 wherein said organizer includes a plurality of fiber trays secured to said clamping means in stacked relation to each other and supported on said main body above said channel.

6. A fiberoptic splice organizer as set forth in claim 5 wherein said organizer includes an elongated longitudinally extending protective cover having an inverted generally U-shaped transverse cross section overlying the uppermost one of said fiber trays and providing a closure for said uppermost tray.

7. A fiberoptic splice organizer as set forth in claim 6 wherein said main body has a length substantially greater than the length of said fiber tray and said protective cover has a length substantially equal to the length of said main body.

8. A fiberoptic splice organizer as set forth in claim 1 wherein said splice holder has a central portion and said splices are disposed to opposite sides of said central portion and said splice holder cover has a central part vertically offset from the side portions of said splice holder cover for engaging said central portion of said splice holder in a selected one of two positions.

9. A fiberoptic splice organizer as set forth in claim 1 wherein said clamping means prevents separation of said protective cover and said tray assembly in an upward direction from said main body and permits separation of said protective cover, said tray assembly and said clamping means as a unit from said main body through either end of said main body in response to movement of said unit in either longitudinally direction relative to said main body.

10. A fiberoptic splice organizer as set forth in claim 1 including means for releasably securing said clamping means at a predetermined position within said main body.

11. A fiberoptic splice organizer comprising an elongated main body formed from flat metal and having a generally rectangular bottom wall and a pair of opposing parallel side walls bent upwardly from said bottom wall, said side walls having upper marginal edges turned inwardly toward each other to form spaced apart lips at the upper end of said body lying within a common plane parallel to said bottom wall, said main body defining an upwardly open channel extending longitudinally therethrough, a pair of strain relief cradles mounted in fixed position on said bottom wall near opposite ends of said channel, each strain relief cradle having a substantially flat central portion disposed adjacent said bottom wall and end portions which curve laterally outwardly and upwardly from said central portion and terminate in longitudinally extending t-bars spaced above said bottom wall, at least one fiber tray assembly including a shallow fiber tray and a splice holder mounted in fixed position within said tray, said tray having a width substantially equal to the width of said main body and supported on said lips above said channel and forming a closure for an associated portion of said channel, said splice holder comprising a rectangular block of material having longitudinally extending and upwardly opening splice receiving grooves therein, a splice holder cover supported on said splice holder in substantially covering relation to said grooves, a protective cover overlying said fiber tray and forming a closure for said tray, and clamping means associated with said main body for releasably securing said fiber tray assembly to said body, said splice holder cover to said splice holder and said protective cover in overlying relation to said fiber tray.

12. A fiberoptic splice organizer as set forth in claim 11 wherein said splice holder cover is selectively positioned on said splice holder in one of two possible positions to accommodate splices of a differing size.

13. A fiberoptic splice organizer as set forth in claim 12 wherein said splice holder cover has a central portion vertically offset from the outboard portions thereof and said outboard portions overly said splice receiving grooves.

14. A fiberoptic splice organizer as set forth in claim 11 wherein the splices have magnetic material associated therewith and said splice organizer includes magnetic means for holding said splices in said splice holder.

15. A fiberoptic splice organizer comprising an elongated main body formed from flat metal and having a generally rectangular bottom wall and a pair of opposing parallel side walls bent upwardly from said bottom wall, said side walls having upper marginal edges turned inwardly toward each other to form spaced apart lips at the upper end of said body lying within a common plane parallel to said bottom wall, said main body defining an upwardly open channel extending longitudinally therethrough, a pair of strain relief members mounted in fixed position on said bottom wall, at least one fiber tray assembly including a shallow fiber tray and a splice holder mounted in fixed position within said fiber tray, said fiber tray having a width substantially equal to the width of said main body and supported on said lips above said channel and forming a closure for an associated portion of said channel, said splice holder comprising a rectangular block of material having a central portion and a plurality of longitudinally extending and upwardly opening splice receiving grooves from therein and a splice holder cover supported on said splice holder in substantially covering relation to said grooves and having a central part vertically offset from the outboard portions thereof and engaging said central portion, said outboard portions overlying said splice receiving grooves, said splice holder cover being assembled with said splice holder in either one of two positions of assembly to accommodate splices of differing size, a protective cover overlying said fiber tray and forming a closure for said fiber tray, and clamping means associated with said main body for releasably securing said fiber tray assembly to said main body, said splice holder cover to said splice holder and said protective cover in overlying relation to said fiber tray.

16. A fiberoptic splice organizer as set forth in claim 15 wherein the splices have magnetic material associated therewith and said splice organzier includes magnetic means for holding said splices in said splice holder when said splice holder cover is removed from said splice holder.

* * * * *